(12) United States Patent
Bard

(10) Patent No.: US 6,445,678 B1
(45) Date of Patent: Sep. 3, 2002

(54) METHOD AND APPARATUS FOR IMPLEMENTING LEAF NODE PROXY IN A NETWORK

(75) Inventor: Steven R. Bard, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/457,089

(22) Filed: Dec. 7, 1999

(51) Int. Cl.[7] ............................................... G01R 31/08
(52) U.S. Cl. ....................................... 370/219; 370/373
(58) Field of Search ................................. 370/219, 220, 370/256, 255, 254, 400, 410, 373

(56) References Cited

U.S. PATENT DOCUMENTS 5,980,078 A * 11/1999 Krivoshein et al. ......... 364/131

FOREIGN PATENT DOCUMENTS

WO  WO 99 35856  7/1999

OTHER PUBLICATIONS

"1394 Trade Accociation Power Specification Part 2: Suspend/Resume Implementation Guidelines" Revision 1.0 1394 TA SPEC 1999001–2, XX, XX, Oct. 5, 1999, page complete XP002156050, p. 10, paragraph 4, p. 16, paragraph 6—p. 18, paragraph 4.

* cited by examiner

Primary Examiner—Wellington Chin
Assistant Examiner—Brenda Pham
(74) Attorney, Agent, or Firm—Alan K. Aldous

(57) ABSTRACT

A method and a system for implementing leaf node proxy in a network are disclosed. In one embodiment, a leaf node is switched to a standby state in response to a standby command. A leaf node self-identification ("self-ID") packet is synthesized in response to leaf node information, which is stored in a parent node. The leaf node self-ID packet is transmitted from the parent node in response to a request.

40 Claims, 10 Drawing Sheets

METHOD AND APPARATUS FOR IMPLEMENTING LEAF NODE PROXY IN A NETWORK

BACKGROUND OF THE INVENTION

1. Field of the Invention

The present invention relates generally to network systems. In particular, the present invention relates to energy consumption in a network system.

2. Description of the Related Art

A network system, or a distributed system typically contains a plurality of nodes. Multiple network buses, such as high-speed serial buses, are normally used to connect between the nodes. Each node usually contains at least one device, which performs certain functions. Typical devices include, but are not limited to, personal computers, Internet servers, printers, telephones, scanners, et cetera.

With increasing performance of each device, higher performance of network buses, such as serial buses, is often required. A typical example of commercially available high performance bus is IEEE ("Institute of Electrical and Electronics Engineer") 1394–1995 and its supplements: IEEE 1394a and P1394b, which are developed by an IEEE working group. One common problem with high-speed serial buses currently used in distributed systems is power consumption.

An active node on a distributed system contains at least one active device, and it typically consumes power regardless of whether the device is in use or not in use. For example, a printer consumes power even though it is not printing.

To reduce power consumption, a method of suspending idle nodes has been employed. This method suspends a node if the node is not in use and resumes the suspended node when it is needed. When a node is suspended, its node-ID ("node identification") is typically no longer valid in the bus topology. Similarly, when a node is resumed, a new node-ID has to be added. Accordingly, a bus reset is required when a node is suspended. For the same reason, a bus reset is also needed if a suspended node is resumed. However, bus reset takes time and resources because each bus reset must re-establish a new root node, set up new node-IDs, negotiate a bus manager, and enumerate unit functions on the bus.

SUMMARY OF THE INVENTION

A leaf node is, in one embodiment, switched to a standby state in response to a standby command. A leaf node self-identification ("self-ID") packet is synthesized in response to leaf node information, which is stored in a parent node. The leaf node self-ID packet is transmitted from the parent node in response to a request.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and a system for implementing leaf node proxy in a distributed system are described.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, et. cetera.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying", et. cetera, refers to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention describes a mechanism to conserve energy in a distributed system or a network system when some nodes are in idle state. Unlike the conventional energy conservation serial bus, such as IEEE 1394a, the present invention does not require bus reset upon entering or exiting the conservation state. In the following descriptions, the terms distributed system and network system are synonymous.

Figure 1:
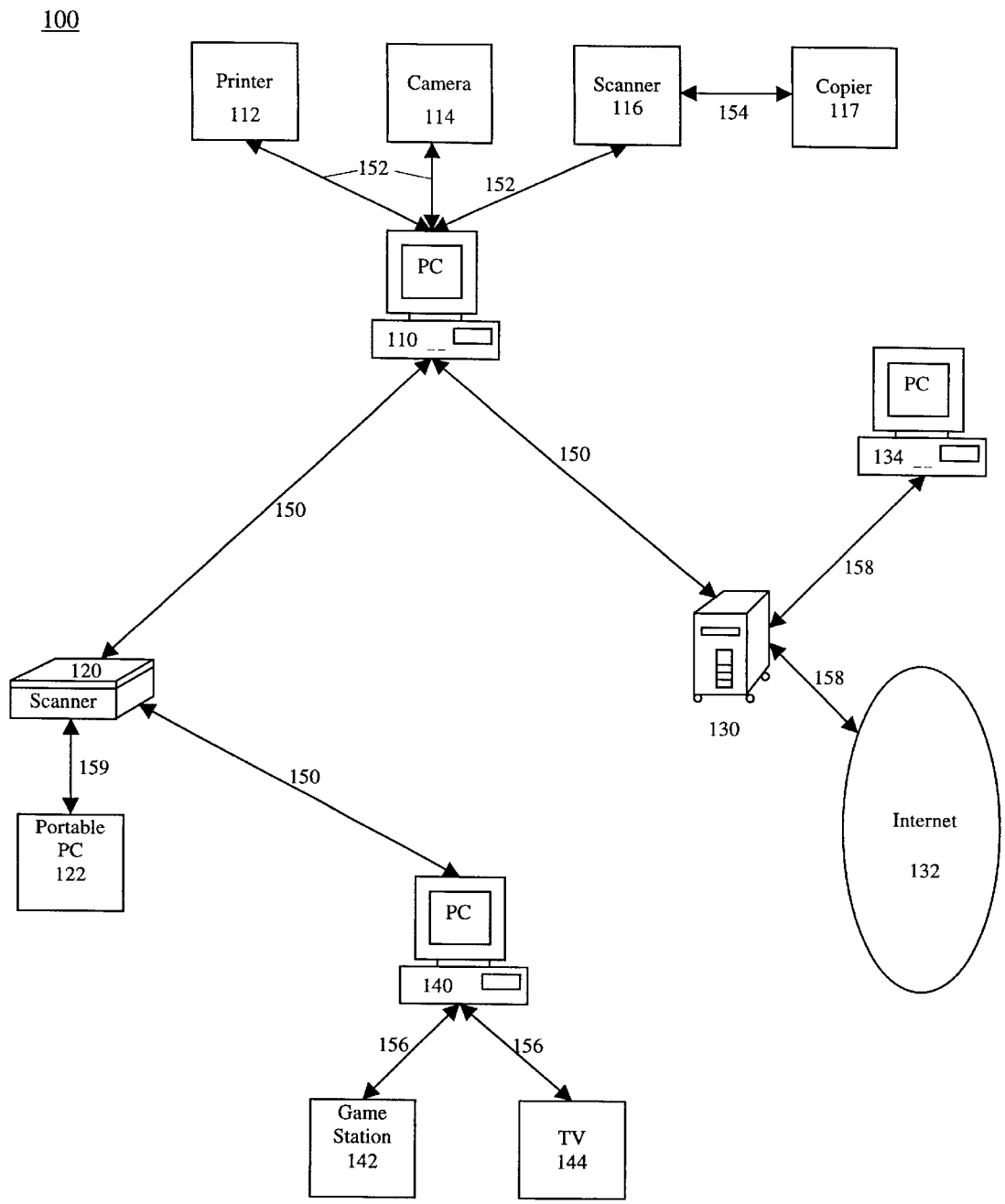
FIG. 1 illustrates one embodiment of a distributed system.

FIG. 1 illustrates one embodiment of a distributed system 100. The distributed system 100 contains a first PC ("personal computer") 110, a scanner 120, a second PC 140, and a server 130 and they are couple through multiple high-speed serial buses 150. First PC 110 is coupled to a printer 112, a camera 114, and a scanner 116 using three high-speed serial buses 152. Scanner 116 is further connected to a copier 117 using a high-performance serial bus 154.

Second PC 140 is coupled to a game station 142 and a TV ("television") 144 through several buses 156. Moreover, server 130 is couple to a third PC 134 and an Internet bridge 132, which is coupled to other networks. In one embodiment, high-speed serial buses 158 are used to connect between server 130, third PC 134, and Internet bridge 132.

Scanner 120 is coupled to a portable PC 122 using a high-speed serial bus 159. Each device discussed above, such as scanner 120 or server 130, can also be considered as a node on a distributed system 100. In one embodiment, a node may contain more than one device. It should be noted that other nodes may be added to distributed system 100, but they are not necessary to understand the invention.

In an alternative embodiment, distributed system 100 may contain (not shown in FIG. 1) a root node, a bus manager/power manager, and node-IDs ("identifications"). A bus manager node includes information of device functions and node-IDs for all nodes on distributed system 100. Moreover, the root node may also be the bus manager. However, the node for root node, bus manager/power manager, may change after a bus reset because each bus reset may change bus topology. For example, before the bus reset, first PC 110 may be the bus manager/power manager node and after the bus reset, third PC 134 may be the bus manager/power manager node.

In another embodiment, the bus manager/power manager node of distributed system 100 keeps a list of node-IDs for all nodes while each node only keeps a list of its parent and child nodes. Because all nodes are interconnected by serial buses, each node can access any devices on any node on distributed system 100. For example, game station 142 can access copier 117 by hopping through second PC 140, scanner 120, first PC 110, and scanner 116.

In operation, if TV node 144 is idling, second PC 140 places TV node 144 in a standby state. When first PC 110, as a bus manager, requests node information from TV node 144, second PC 140 synthesizes node information for TV node 144 and responds node information to first PC 110 for TV node 144. Upon request of restoration, second PC 140 restores TV node 144 to an active state and refreshes node information for TV node 144. In other words, a parent node acts as a proxy for the standby node. Because of the proxy, the standby node is being treated as an active node by the bus manager. Accordingly, bus reset is not needed for a node entering and exiting a standby state. Therefore, using standby state improves overall performance of a distributed system. It should be appreciated that the present invention may be applicable to different network configurations.

Figure 2:
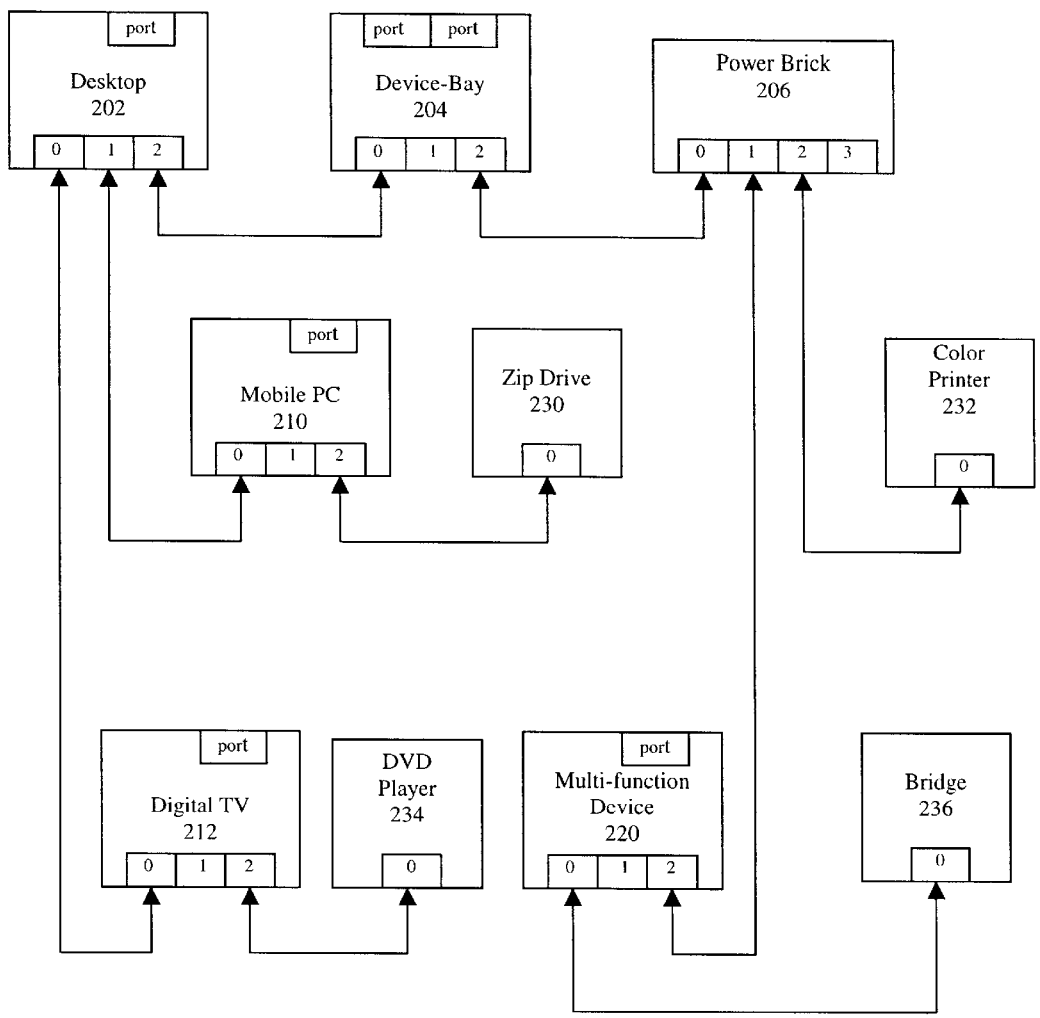
FIG. 2 illustrates one embodiment of a distributed system including a plurality of serial buses.

FIG. 2 illustrates one embodiment of a network 200 including multiple serial buses. Network 200 contains multiple nodes and each node contains at least one device. For example, node 234 contains a DVD ("digital video disc") player and node 234 may contain devices other than a DVD player. In one embodiment, node 202 is a desktop; node 204 is a device-bay; node 206 is a power brick; node 210 is a mobile PC; node 230 is a zip drive; node 232 is a color printer; node 212 is a digital TV; node 234 is a DVD player; node 220 is a multi-function device; and node 236 is a network bridge. Each node is interconnected to at least one other node using serial buses and each node has at least one port.

In one embodiment, each node is assigned a node-ID ("identification") and each node contains its own node-ID, and knows its parent and child connections. Each node may contain more than one port. For example, node 202 contains four ports where ports 0, 1, and 2 are connected to nodes 212, 210, and 204, respectively. Moreover, node 230 only has one port where the port is coupled to port 2 of node 210. Node-ID and bus topology (or configuration) can change during a bus reset because a bus reset may add new node-IDs and delete suspended node-IDs.

Each node may have a parent node and an owner node. While a parent node is directly coupled to a child node, an owner node logically owns the child node. A parent node is not necessarily the owner node. For example, the parent node for the color printer node 232 is node 206, but the color printer node 232 could be owned by the desktop at node 202.

In another embodiment, a leaf node does not have child nodes.

However, node 210 could become a leaf node if node 230 is suspended or logically disconnected. For example, if Mobile PC at node 210 has been idle and zip drive at node 230 has just been logically disconnected, node 210 can be placed in the standby state and the desktop at node 202 will act as proxy for node 210. In one embodiment, only a leaf node could be placed in the standby state.

Figure 3:
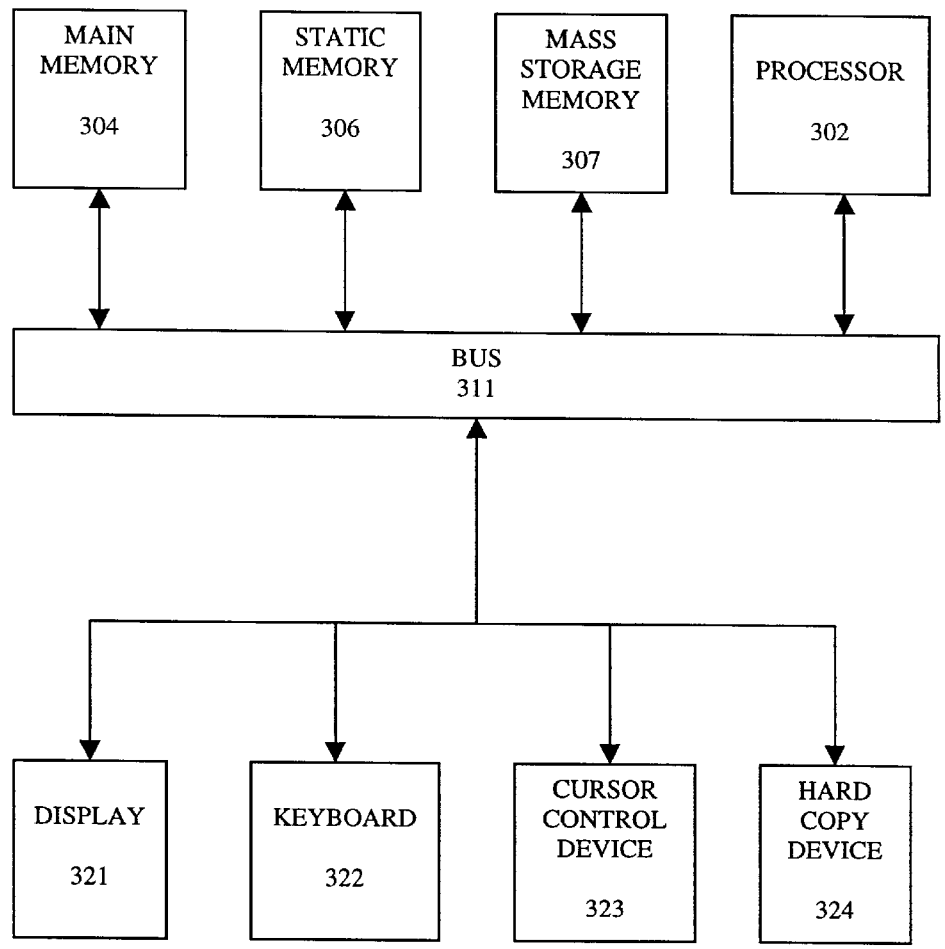
FIG. 3 illustrates one embodiment of a digital system that is capable of being a root node or a bus manager.

FIG. 3 illustrates one embodiment of a digital system 300 that is capable of being a root node or a bus manager. Digital system 300 comprises a bus or other communication means 311 for communicating information, and a processor 302 coupled with bus 311 for processing information. Processor 302 includes a microprocessor, but is not limited to a microprocessor, such as an Intel Architecture Microprocessor, manufactured by Intel Corporation of Santa Clara, Calif., the corporate assignee of the present invention. Processor 302 may also be another processor such as the PowerPC™, Alpha™, et cetera.

System 300 further comprises a random access memory (RAM), or other dynamic storage device 304 (referred to as main memory) coupled to bus 311 for storing information and instructions to be executed by processor 302. Main memory 304 may also be used for storing temporary variables or other intermediate information during execution of instructions by processor 302. Digital system 300 also comprises a read only memory (ROM) and/or other static storage device 306 coupled to bus 311 for storing static information and instructions for processor 302, and a data storage device 307, such as a magnetic disk or optical disk and its corresponding disk drive. Data storage device 307 is coupled to bus 111 for storing information and instructions.

Digital system 300 may further be coupled to a display device 321, such as a cathode ray tube (CRT) or liquid crystal display (LCD), coupled to bus 311 for displaying information to a computer user. An alphanumeric input device 322, including alphanumeric and other keys, may also be coupled to bus 311 for communicating information and command selections to processor 302. An additional user input device is cursor control 323, such as a mouse, trackball, trackpad, stylus, or cursor direction keys, coupled to bus 311 for communicating direction information and command selections to processor 302, and for controlling cursor movement on display 321.

Another device which may be coupled to bus 311 is hard copy device 324, which may be used for printing instructions, data, or other information on a medium such as paper, film, or similar types of media. Furthermore, a sound recording and playback device, such as a speaker and/or microphone may optionally be coupled to bus 311 for audio interfacing with digital system 300. Note that any or all of the components of digital system 300 and associated hardware may be used in the present invention. However, it can be appreciated that other configurations of the computer system may include some or all of the devices.

Figure 4:
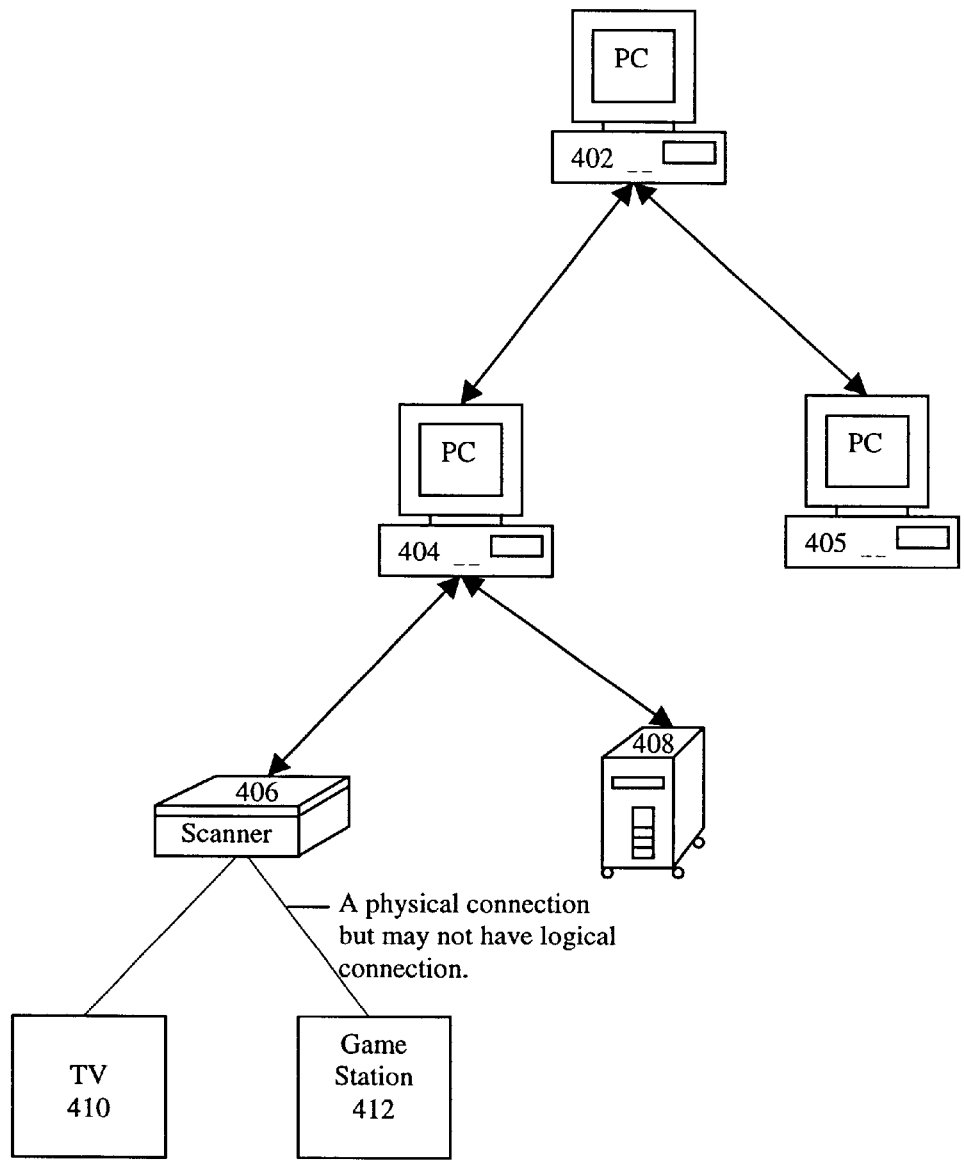
FIG. 4 illustrates one embodiment of a network illustrating parent and child nodes.

FIG. 4 illustrates one embodiment of a network 400 illustrating parent and child nodes. Network 400 contains a first PC 402, a second PC 404, a third PC 405, a scanner 406, a server 408, a TV 410, and a game station 412. First PC 402, second PC 404 and scanner 406 may be a parent node since they have at least one child node. Similarly, TV 410, game station 412, and server 408 could only be leaf nodes because they do not have child nodes. A parent node could become a leaf node once its child nodes are logically or physically disconnected from the parent node.

In one embodiment, second PC 404 is a parent node of scanner 406 and scanner 406 is a leaf node since TV 410 and game station 412 are not logically connected to scanner 406 even though they may be physically linked. Each leaf node has a parent node and is coupled to the rest of the network through its parent node.

Moreover, each node may be owned by another node where the owner node logically owns the node. For example, node 406 contains a scanner and it can be owned by third PC at node 405. Even though node 406 does not directly connect to node 405, they are logically connected through the network system.

Each node contains at least one device which consumes power. Even though an idle device does not perform any tasks, the node still consumes power. For example, node 406 contains a scanner and it consumes power even if it is not operating. To conserve power consumption, a mechanism of placing the idle node in a standby state is used. In one embodiment, standby state consumes a reduced or minimum or even amount of power. In one embodiment, the bus manager treats standby nodes as active nodes and consequently bus reset is not required for a node to enter or exit the standby state.

In another embodiment, when leaf node enters the standby state, the parent node creates a leaf node database, which includes a leaf node self-ID. A leaf node self-ID contains necessary node information of the leaf node, such as, for example, node-ID. In this embodiment, the parent node establishes leaf node information by capturing a leaf node self-ID packet that is initially sent when the leaf node is active. Once the leaf node database is established, the parent maintains the database and synthesizes leaf node self-ID packets when the leaf node would be required to process had it not been in the standby state.

In another embodiment, a leaf node may be placed in the standby state only if it has one active connection and that active connection is to its parent node. All other ports in the node may be disconnected, suspended or disabled. Entering the standby state may be initiated by a parent node, an owner node, or the leaf node itself.

When a standby node is in the standby state, the standby node can be restored by a restoring signal, which may be initiated by the parent node, owner node or the standby node itself. In one embodiment, the standby node may request to be restored when it receives new information or a connection request. New information could be an incoming e-mail over the Internet. A new connection could be the logical reconnection between the standby node and a new child node. Such a new connection destroys the leaf node status and consequently, the standby node has to be restored. When a standby node is restored, the restored node will receive an updated node self-ID, which contains necessary updated information for the restored node.

Figure 5:
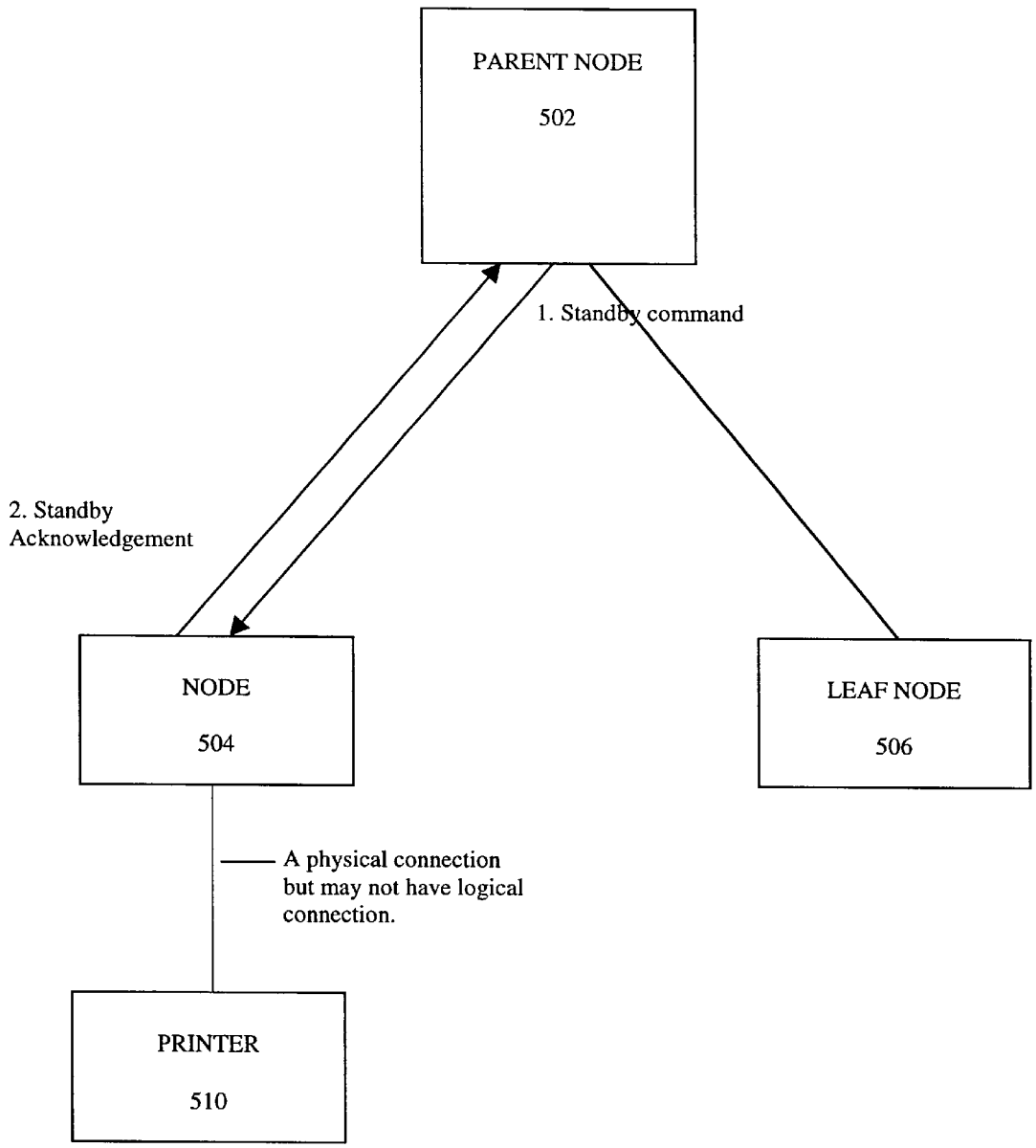
FIG. 5 is a flowchart illustrating one embodiment of a network in which a parent node places a leaf node in a standby state.

FIG. 5 is a flowchart 500 illustrating one embodiment of a network in which a parent node places a leaf node in a standby state. Flowchart 500 contains a parent node 502, a node 504, a leaf node 506 and a printer node 510. A bus, such as a high-performance serial bus, may be used to connect between the nodes. The link between node 504 and printer node 510 may have physical connection but it may not have a logical connection. In one embodiment, parent node 502 issues a standby command, also known as a standby signal, to place node 504 in a standby state.

Upon receipt of the standby command, node 504 may examine whether it is a leaf node. When node 504 determines that one active connection exists and that the connection is to its parent port from which the standby command was received, the leaf node 504 sends a standby acknowledgement and enters the standby state. In one embodiment, the standby command is always sent to the leaf node and if it is able, the leaf node transmits the standby signal to the parent node. In another embodiment, the leaf node is configured to transmit a standby signal to the parent node in response to a standby command regardless of the source of the standby commend. The issuance of a standby command may be triggered by various conditions and some conditions may come from the owner node or bus manager.

Figure 6:
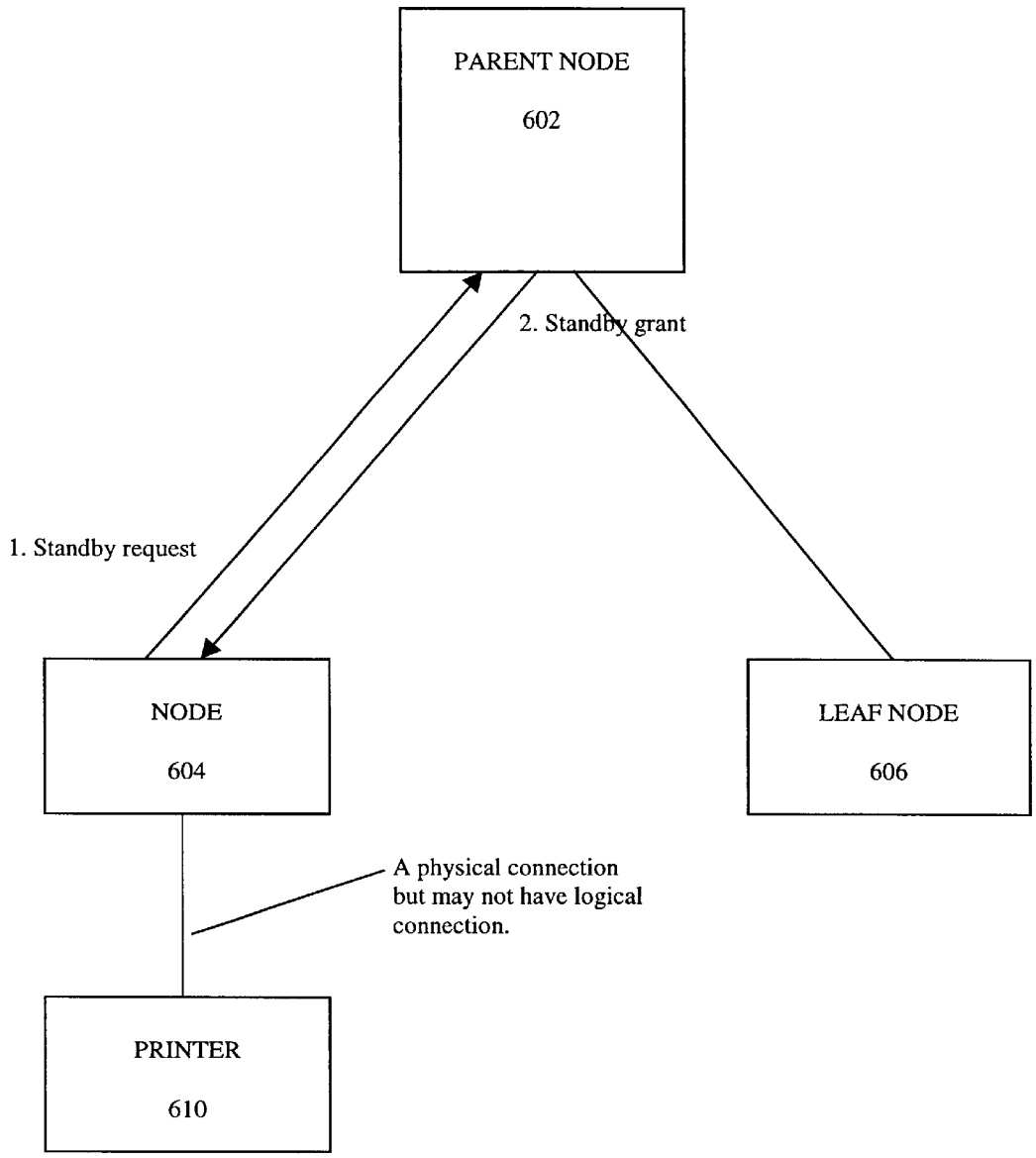
FIG. 6 is a flowchart illustrating one embodiment of a network in which a leaf node requests to enter the standby state.

FIG. 6 is a flowchart 600 illustrating one embodiment of a network in which a leaf node requests to enter the standby state. Flowchart 600 includes a parent node 602, a node 604, a leaf node 606, and a printer node 610. Multiple high-performance serial buses may be used to connect among the nodes. In one embodiment, a standby request is initiated by leaf node 604. Upon receipt of the standby request, parent node 602 sends a standby grant indicating that the standby request is granted. Node 604 enters the standby state when the signal of standby grant reaches node 604.

In another embodiment, node 604 issues a standby request in response to a timeout device, a link disconnection, or a sensor. It should be noted that other conditions might be possible to cause a leaf node to issue a standby request. The timeout device indicates that leaf node 604 has been idling for at least a fixed period of time. Consequently, an idling node is a good candidate to be placed in the standby state.

A link disconnection indicates a logical disconnection between a child node, such as node 610, and node 604. A link disconnection in one embodiment causes a node to become a leaf node and a leaf node is a good candidate to be placed in the standby state. In another embodiment, a sensor indicates a specific environmental condition, such as temperature or moisture. For example, a device at node 604 cannot function correctly when the temperature reaches a certain degree and when it does, node 604 will be shut down.

In one operation, leaf node 604 issues a standby request for entering the standby state. Upon receipt of the standby request, the parent node 602 prepares a leaf node database for the proxy and issues a standby grant. After receipt of the standby grant, leaf node 604 enters the standby state.

Figure 7:
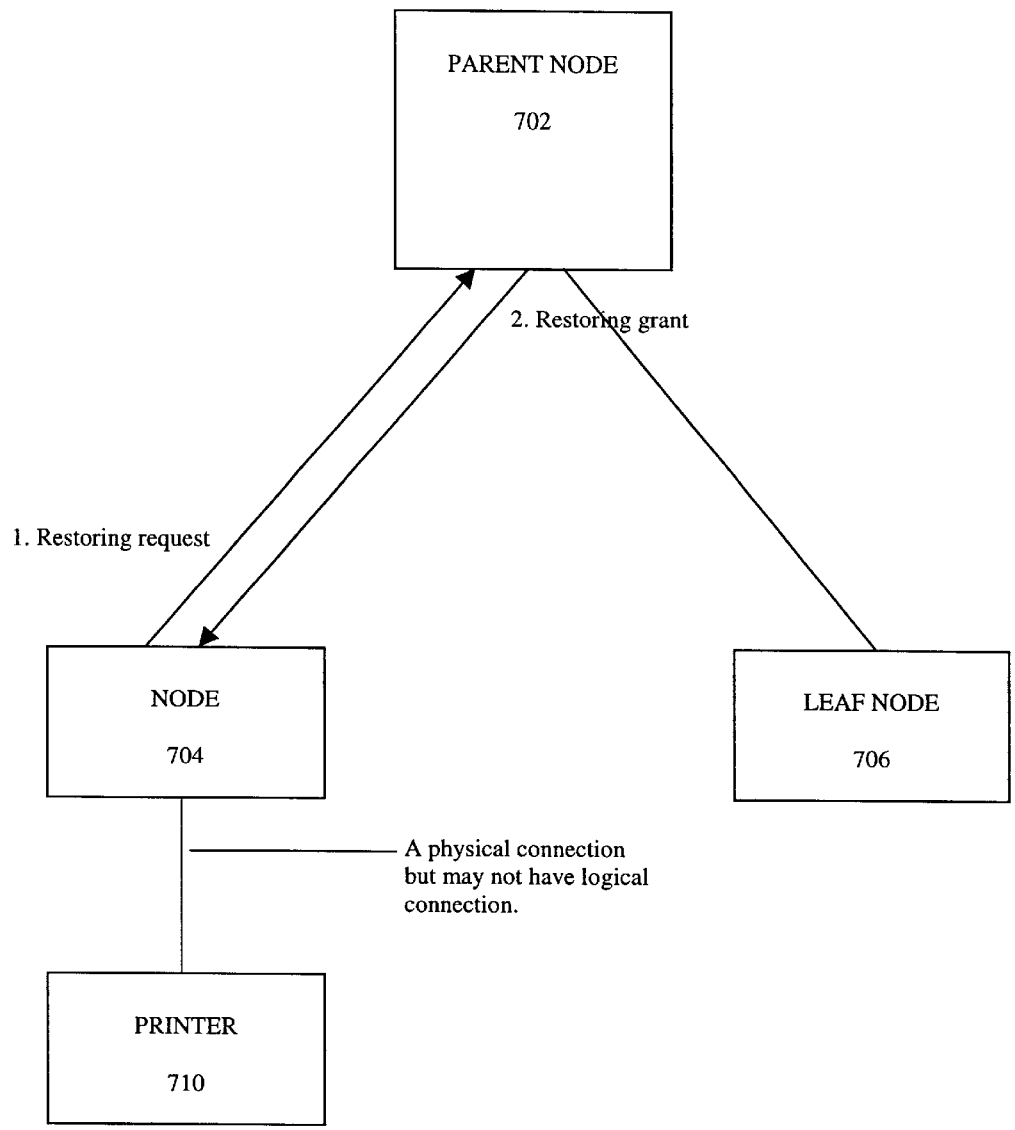
FIG. 7 is a flowchart illustrating one embodiment of a network having a standby node requesting to exit the standby state.

FIG. 7 is a flowchart 700 illustrating one embodiment of a network having a standby node that requests to exit the standby state. Flowchart 700 contains a parent node 702, a node 704, a leaf node 706, and a printer node 710. Multiple high-performance serial buses are used for connecting among nodes. As discussed previously, even though there is a physical link between node 704 and 710, node 704 is a leaf node because there is no logical link between node 704 and 710.

In one embodiment, a standby node may request to exit the standby state and be restored to the active state in response to a trigger, such as an incoming e-mail, a new link, et cetera. For example, a network server in a standby state may request to be restored when it receives an incoming email. Also, a new link to a standby node will trigger the standby node to exit the standby state because the new link destroys the leaf node status. For example, a logical link between node 710 and node 704 destroys leaf node status of node 704.

In one embodiment, a leaf node in standby state will be restored when either the leaf node or the parent node asserts the restore signal. For example, standby node 704 issues a restoring request indicating that node 704 wants to exit the standby state. Upon receipt of the restoring request, parent node 702 sends a restoring grant for permitting restoration. Once the restoration is granted, node 704 receives the leaf node self-ID from parent node 702 and updates its database in response to the leaf node self-ID. It should be noted that other conditions may also trigger leaf node 704 to be restored, but they are not necessary in understanding the invention.

Figure 8:
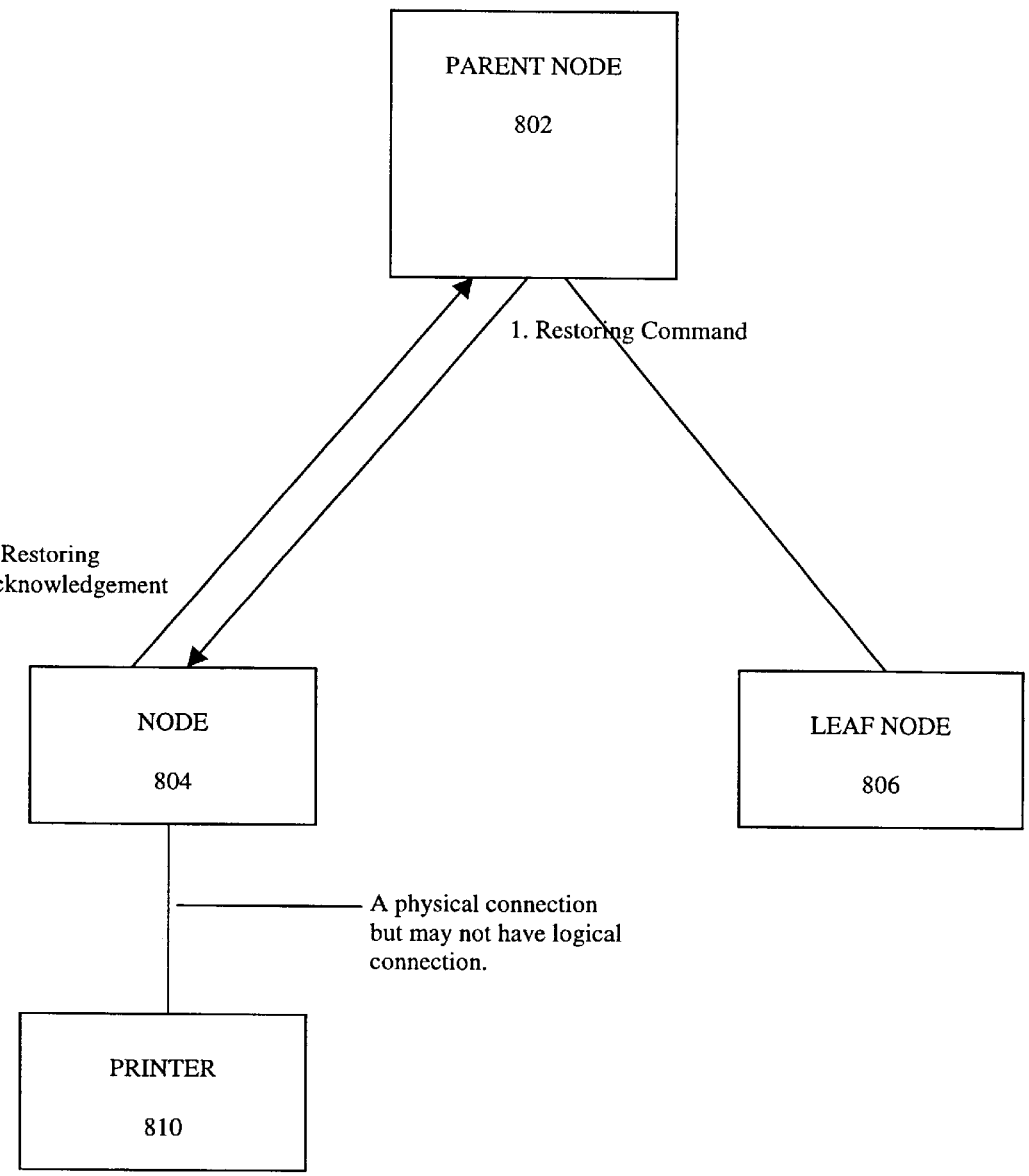
FIG. 8 is a flowchart illustrating one embodiment of a network having a standby node requesting to be restored.

FIG. 8 is a flowchart 800 illustrating one embodiment of a network having a standby node that requests to be restored. Flowchart 800 contains a parent node 802, a leaf node 804, a leaf node 806, and a printer node 810 and they are interconnected through multiple high-speed serial buses. In one embodiment, a parent node can restore a standby node to an active state in response to a request from an owner node, or a bus manager.

In one embodiment, bus manager may request parent node to restore a standby node. An owner node can also request the parent node to restore a standby node. For example, if node 806 owns printer node 810 and node 806 wants to access the printer, node 806 could request parent node 802 to restore node 804. Once node 804 is restored, a logical link between node 804 and printer node 810 could be established via resuming the logical connection between node 804 and printer node 810. It should be noted that the owner node is not necessarily the parent node and the owner node may change over time.

In operation, parent node 802 issues a restoring signal to indicate that node 804 should be restored. Upon receipt of the restoring signal, standby node 804 sends a restoring acknowledgement to indicate that it is restoring.

Once parent node 802 receives the acknowledgement, parent node 802 sends the standby node self-ID packets to node 804. As discussed previously, the self-ID packets contain the data, such as a new node ID, which is necessary to restore node 804.

Figure 9:
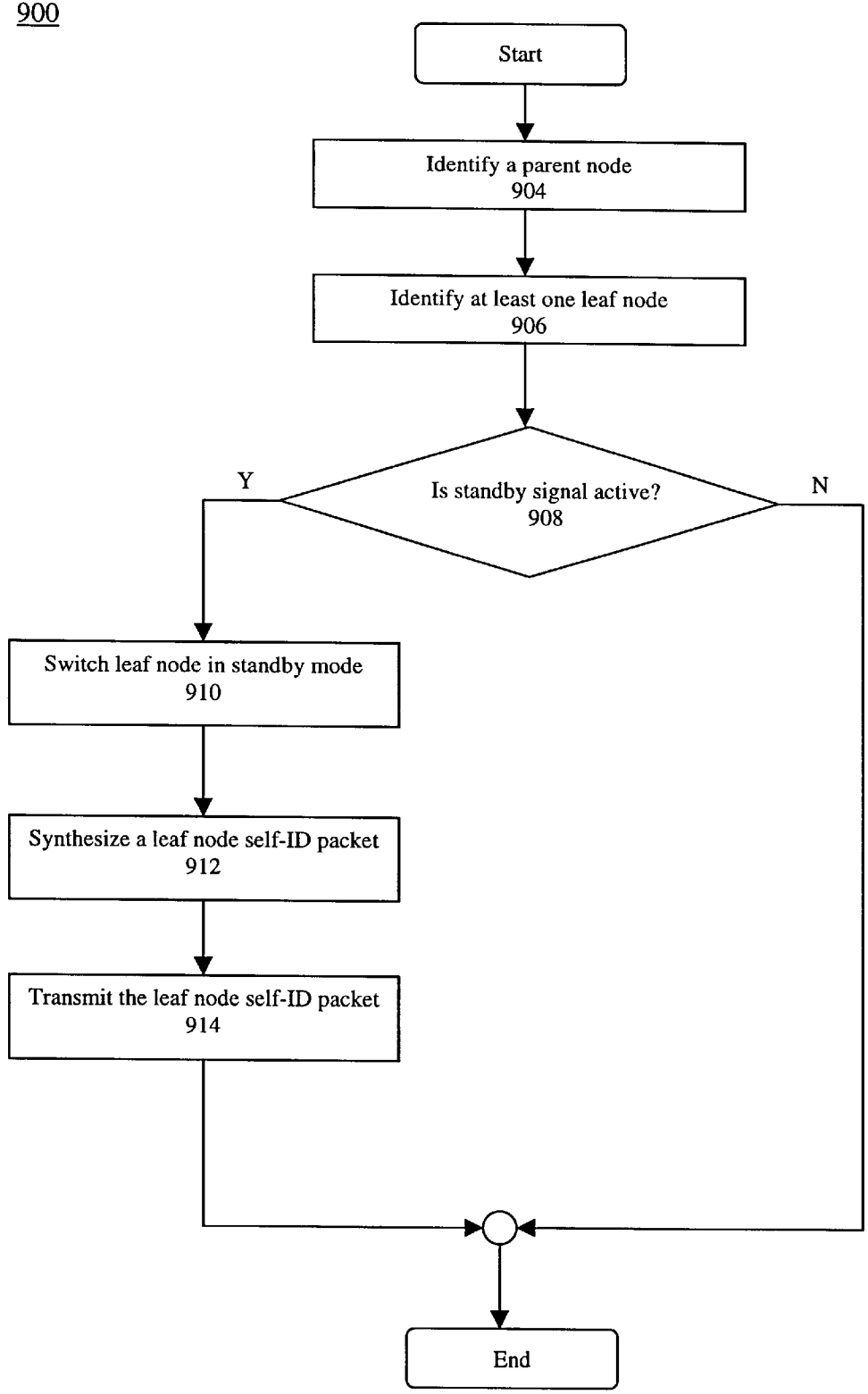
FIG. 9 is a flowchart illustrating one embodiment of a process of switching a leaf node to a standby state.

FIG. 9 is a flowchart 900 illustrating one embodiment of a process of switching a leaf node to a standby state or mode. A process begins at start block and proceeds to block 904 to identify a parent node. After block 904, the process proceeds to block 906 to identify at least one leaf node. The process continues to proceed to the next block where the process determines whether a standby signal is active. If block 908 is true, which means the standby signal is active, the process moves to block 910. At block 910, the process places the leaf node in a standby state.

At block 912, the process synthesizes leaf node self-ID packets. After block 912, the process proceeds to block 914. At block 914, leaf node self-ID packets may be transmitted upon request of other nodes. After block 914, the process proceeds to the end block where the process ends. On the other hand, if the block 908 is false, which indicates that the standby signal is not active, the process jumps to the end block where the process ends.

Figure 10:
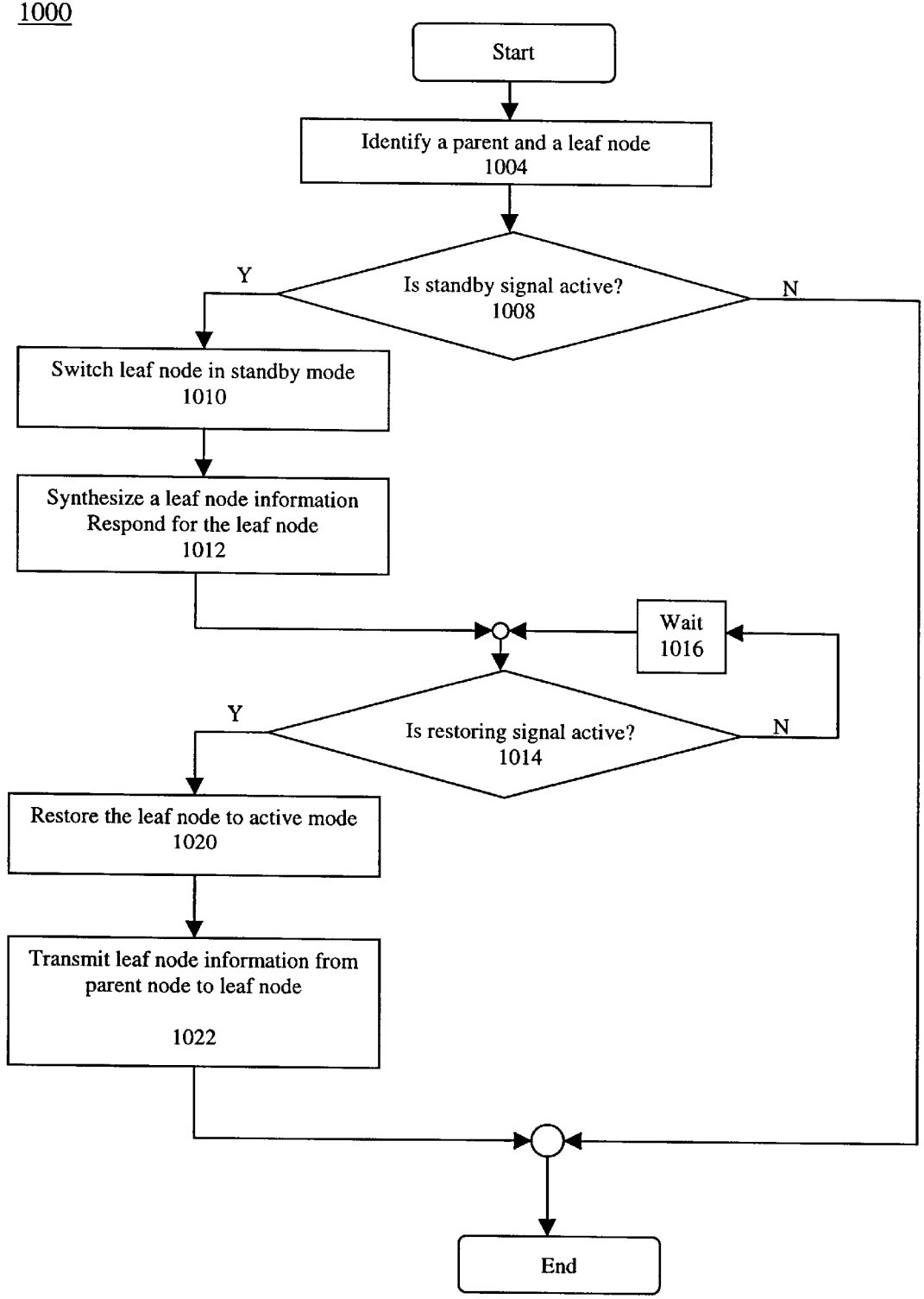
FIG. 10 is a flowchart illustrating one embodiment of a process of entering and exiting a standby state.

FIG. 10 is a flowchart 1000 illustrating one embodiment of a process of entering and exiting a standby state. A process starts at the starting block and proceeds to block 1004 to identify a parent node and at least one leaf node. After block 1004, the process proceeds to block 1008 to examine whether the standby signal is active. If block 1008 is true, which means that the standby signal is active, the process proceeds to block 1010. At block 1010, the process places the leaf node in a standby state. Subsequently, the process proceeds to block 1012 where the process synthesizes leaf node information. Upon request, the leaf node information is transmitted over the network by the parent node for the leaf node. After block 1012, the process proceeds to block 1014.

At block 1014, the process examines whether the restoring signal is active. If block 1014 is true, which means that the restoring signal is active, the process proceeds to block 1020. At block 1020, the process restores the leaf node to active mode. The process subsequently moves to block 1022 where the process transmits the leaf node information from the parent node to the leaf node. After block 1022, the process moves to the end block where the process ends. On the other hand, if the block 1014 is false, which means that the restoring signal is not active, the process moves to block 1016 where the process waits a cycle. After block 1016, the process loops back to block 1014 and the process repeats from block 1014.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims, which in themselves recite only those features regarded as essential to the invention.

Thus, a method and a system for implementing leaf node proxy in a network have been described.

What is claimed is:

1. A method comprising:
   switching a leaf node to a standby state in response to receiving a standby command at a parent node;
   receiving a request at the parent node from a third node to access information at the leaf node while the leaf node is in the standby state;
   synthesizing leaf node information stored in the parent node; and
   transmitting the leaf node information from the parent node to the third node in response to the request.

2. The method of claim 1, wherein synthesizing the leaf node information at the parent node comprises synthesizing a leaf node self-identification ("self-ID") packet.

3. The method of claim 1, further comprising:

generating a leaf node database in the parent node prior to switching the leaf node into the standby state;

capturing the leaf node information; and storing the leaf node information in the leaf node database.

4. The method of claim 1, further comprising receiving information for the leaf node at the parent node from the third node after the leaf node is in the standby state.

5. The method of claim 2, further comprising transmitting the self-ID packet from the parent node to the leaf node when the leaf node is restored.

6. The method of claim 1, wherein switching the leaf node to the standby state comprises generating a standby signal at the parent node in response to receiving a command from an owner node.

7. The method of claim 1, wherein switching the leaf node to the standby state comprises generating a standby signal at the parent node in response to receiving a standby command from the leaf node.

8. The method of claim 1, further comprising transmitting a restoring signal from the parent node to the leaf node in order for the leaf node to exit the standby state.

9. The method of claim 8, further comprising receiving a signal from an owner node indicating that the leaf node is to exit the standby state.

10. The method of claim 8, further comprising receiving a signal from the leaf node indicating that the leaf node is to exit the standby state.

11. The method of claim 2, further comprising updating the leaf node self-ID packet in response to information received at the parent node.

12. The method of claim 2, wherein synthesizing the self-ID packet includes storing node ID, power classes, node links, and port number in the parent node.

13. A network comprising:

a leaf node;

a bus coupled to the leaf node; and a parent node, coupled to the bus, to switch the leaf node to a standby mode in response to receiving a standby signal from the leaf node, the parent node also to synthesize leaf node information and to reply to requests from a third node to access the leaf node based upon the leaf node information while the leaf node is in the standby state.

14. The network of claim 13, wherein the parent node further restores the leaf node from the standby mode to an active mode in response to receiving a restoring signal from the leaf node.

15. The network of claim 13, wherein the parent node also:

creates a leaf node database in the parent node;

receives information over the network for the leaf node; and stores the information in the leaf node database.

16. The network of claim 13, wherein the leaf node information includes a leaf node self-identification ("self-ID") packet.

17. The network of claim 16, wherein the parent node transmits the leaf node self-identification ("self-ID") packet to the leaf node when the leaf node returns to the active mode.

18. A network system comprising:

a leaf node; and a parent node, coupled to the leaf node, to:

switch the leaf node to a standby state in response to receiving a standby command from the leaf node;

receive a request from a third node to access information at the leaf node while the leaf node is in the standby state;

synthesize stored leaf node information; and transmit the leaf node information to the third node in response to the request.

19. The network system of claim 18, wherein the parent node synthesizes the leaf node information by synthesizing a leaf node self-identification ("self-ID") packet.

20. The network system of claim 18, wherein the parent node also restores the leaf node to an active mode in response to receiving a restoring signal from the leaf node.

21. The network system of claim 18, wherein the parent node also creates a leaf node database in the parent node and stores the leave node information in the leaf node database.

22. The network system of claim 18, wherein the parent node provides leaf node information to the network system when the leaf node is in standby mode.

23. The network system of claim 19, wherein the parent node transmits the leaf node self-ID packet to the leaf node when the leaf node is switched back to an active mode.

24. An article of manufacture comprising a digital processing usable medium having readable program code embodied in the medium, which, when executed by a processing device, causes the processing device to:

identify a parent node;

identify at least one leaf node of the parent node;

switch the leaf node to a standby mode in response to receiving a standby signal at the parent node from the leaf node;

receive a request from a third node to access information at the leaf node;

synthesize a leaf node self-identification ("self-ID") packet at the parent node in response to leaf node information stored in the parent node; and transmit the leaf node self-ID packet from the parent node to the third node in response to the request.

25. The article of manufacture of claim 24, further comprising program code, which, when executed by the processing device, causes the processing device to restore leaf node to an active mode in response to receiving a restoring signal from the leaf node.

26. The article of manufacture of claim 24, further comprising program code, which, when executed by the processing device, causes the processing device to:

create a leaf node database in the parent node; and store the leaf node information in the leaf node database.

27. The article of manufacture of claim 24, further comprising program code, which, when executed by the processing device, causes the processing device to provide leaf node information when the leaf node is in standby mode.

28. The article of manufacture of claim 24, further comprising program code, which, when executed by the processing device, causes the processing device to transmit the leaf node self-ID packet to the leaf node when the leaf node returns to an active mode.

29. A network comprising:

a leaf node;

a bus coupled to the leaf node; and a parent node, coupled to the bus, to switch the leaf node to a standby mode in response to transmitting a standby signal to the leaf node and receiving an acknowledge signal from the leaf node, the parent node also to synthesize leaf node information and to reply to requests from a third node to access the leaf node based upon the leaf node information while the leaf node is in the standby state.

30. The network of claim 29, wherein the parent node further restores the leaf node from the standby mode to an active mode in response to receiving a restoring signal from the leaf node.

31. The network of claim 29, wherein the parent node further restores the leaf node from the standby mode to an active mode in response to transmitting a restoring signal to the leaf node.

32. The network of claim 29, wherein the parent node also:

creates a leaf node database in the parent node;

receives information over the network for the leaf node; and stores the information in the leaf node database.

33. The network of claim 29, wherein the leaf node information includes a leaf node self-identification ("self-ID") packet.

34. The network of claim 33, wherein the parent node transmits the leaf node self-identification ("self-ID") packet to the leaf node when the leaf node returns to the active mode.

35. A network system comprising:

a leaf node; and a parent node, coupled to the leaf node, to:
switch the leaf node to a standby state in response to transmitting a standby signal to the leaf node and receiving an acknowledge signal from the leaf node;
receive a request from a third node to access information at the leaf node while the leaf node is in the standby state;
synthesize stored leaf node information; and
transmit the leaf node information to the third node in response to the request.

36. The network system of claim 35, wherein the parent node restores the leaf node to an active mode in response to receiving a restoring signal from the leaf node.

37. The network of claim 35, wherein the parent node restores the leaf node from the standby mode to an active mode in response to transmitting a restoring signal to the leaf node.

38. An article of manufacture comprising a digital processing usable medium having readable program code embodied in the medium, which, when executed by a processing device, causes the processing device to:

identify a parent node;

identify at least one leaf node of the parent node;

switch the leaf node to a standby mode in response to transmitting a standby signal to the leaf node and receiving an acknowledge signal from the leaf node;

receive a request from a third node to access information at the leaf node;

synthesize a leaf node self-identification ("self-ID") packet at the parent node in response to leaf node information stored in the parent node; and transmit the leaf node self-ID packet from the parent node to the third node in response to the request.

39. The article of manufacture of claim 38, further comprising program code, which, when executed by the processing device, causes the processing device to restore leaf node to an active mode in response to receiving a restoring signal from the leaf node.

40. The article of manufacture of claim 38, further comprising program code, which, when executed by the processing device, causes the processing device to restore leaf node to an active mode in response to transmitting a restoring signal to the leaf node.

* * * * *